United States Patent
Grandbois et al.

(10) Patent No.: US 6,952,452 B2
(45) Date of Patent: Oct. 4, 2005

(54) METHOD OF DETECTING INTERNAL FRAME SKIPS BY MPEG VIDEO DECODERS

(75) Inventors: Brett J. Grandbois, San Jose, CA (US); Gareth D. Trevers, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 430 days.

(21) Appl. No.: 10/185,259

(22) Filed: Jun. 28, 2002

(65) Prior Publication Data

US 2004/0001550 A1 Jan. 1, 2004

(51) Int. Cl.$^7$ ............................................. H04N 7/18
(52) U.S. Cl. .............................. 375/240.25; 375/240.26
(58) Field of Search ........................ 375/240.11–240.29

(56) References Cited

U.S. PATENT DOCUMENTS 5,973,744 A * 10/1999 Kim ...................... 375/240.24
6,546,065 B1 * 4/2003 Shimosakoda ............... 375/364
6,591,396 B1 * 7/2003 Honda ......................... 714/798
2002/0146071 A1 * 10/2002 Liu et al. ................ 375/240.16

OTHER PUBLICATIONS

Gareth Trevers et al., "Method and/or Architecture of Implementing MPEG Frame Display Using Four Frame Stores", U.S. Appl. No. 10/137,015, filed May 2, 2002.

* cited by examiner

Primary Examiner—Andy Rao
(74) Attorney, Agent, or Firm—Christopher P. Maiorana, P.C.

(57) ABSTRACT

An apparatus comprising a first circuit and a second circuit. The first circuit may be configured to (i) generate a random number signal, (ii) read a data signal, and (iii) generate one or more control signals. The second circuit may be configured to (i) store the random number signal, (ii) receive and store a decoded video signal, and (iii) present the data signal. The first circuit may be further configured to compare the data signal with the random number signal and (i) when the data signal matches the random number signal generate a first of the control signals and (ii) when the data signal fails to match the random number signal generate a second of the control signals.

18 Claims, 4 Drawing Sheets

METHOD OF DETECTING INTERNAL FRAME SKIPS BY MPEG VIDEO DECODERS

RELATED APPLICATION

This application may relate to co-pending application U.S. Ser. No. 10/137,015, filed May 2, 2002, which is hereby incorporated by reference in its entirety.

FIELD OF THE INVENTION

The present invention relates to video decoders generally and, more particularly, to a method and/or apparatus for detecting MPEG video decoder internal frame skips.

BACKGROUND OF THE INVENTION

The Motion Picture Expert Group (MPEG) video specifications (i.e., ISO/IEC standard 11172, ISO/IEC standard 13818, etc.) are very complicated industry standards for compressing, transmitting, and decompressing digital video signals for a variety of situations. Due to the complexity of the MPEG standard, devices that properly process MPEG compliant bit streams are at least as complex as the MPEG specification.

Because of the complexity of the devices that implement MPEG processing, most MPEG video decoders execute many features of the MPEG process without intervention of a video decoder system central processing unit (CPU). Most CPUs would be overwhelmed by the quantity of the processing that is performed on a standard MPEG bit stream. However, some MPEG video decoders perform so much of the MPEG video processing that information the system CPU might require for the system to function properly is not provided by the decoder. For example, when errors are detected in the picture data some MPEG decoders will skip (i.e., fail to decode) the MPEG video frames without notifying the system CPU of the skip. Frame skips can cause a problem when the skipped frames are displayed. The CPU will not be notified that the MPEG decoder has not decoded these frames and will attempt to display the un-decoded frames as normal (i.e., decoded) frames. Invalid and/or incoherent video images can be displayed.

It would be desirable to have a video decoder that (i) is compliant with MPEG standards, (ii) detects when a video frame has been skipped, (iii) provides the system CPU notification that the respective frame was skipped, and/or (iv) reduces and/or eliminates the display of un-decoded video frames due to frame skips.

SUMMARY OF THE INVENTION

The present invention concerns an apparatus comprising a first circuit and a second circuit. The first circuit may be configured to (i) generate a random number signal, (ii) read a data signal, and (iii) generate one or more control signals. The second circuit may be configured to (i) store the random number signal, (ii) receive and store a decoded video signal, and (iii) present the data signal. The first circuit may be further configured to compare the data signal with the random number signal and (i) when the data signal matches the random number signal generate a first of the control signals and (ii) when the data signal fails to match the random number signal generate a second of the control signals.

The objects, features and advantages of the present invention include providing a method and/or apparatus for detecting video decoder internal frame skips that may (i) be compliant with MPEG standards, (ii) detect when a video frame has been skipped, (iii) provide the system CPU notification that the respective frame was skipped, and/or (iv) reduce and/or eliminate the display of un-decoded video frames due to frame skips.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
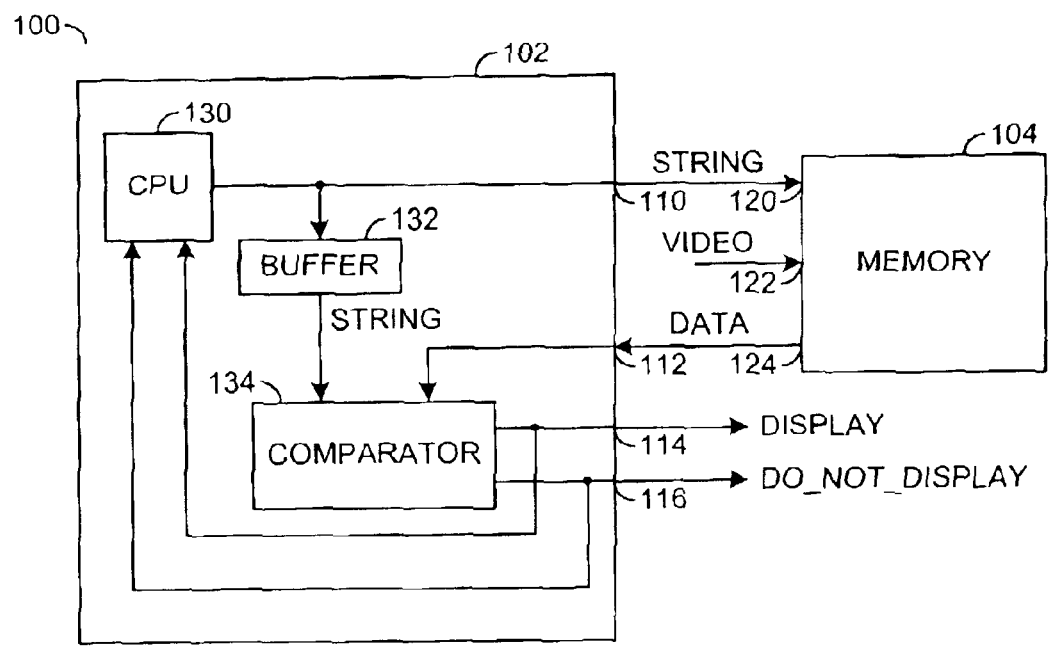
FIG. 1 is a diagram illustrating a video frame skip detection circuit of the present invention.

Referring to FIG. 1, a diagram illustrating a circuit 100 is shown in accordance with a preferred embodiment of the present invention. The circuit 100 may be implemented as a video frame skip detection circuit. The circuit 100 is generally implemented in connection with a video decoder system (not shown). The video decoder is generally compliant with one or more Motion Picture Expert Group (MPEG) video specifications and/or standards (e.g., ISO/IEC standard 11172, ISO/IEC standard 13818, etc.). However, the circuit 100 may be implemented in connection with any appropriate video decoder to meet the design criteria of a particular application.

The circuit 100 generally comprises a circuit 102 and a circuit 104. The circuit 102 may be implemented as a control circuit. The circuit 102 may be configured to control the frame skip detection process of the present invention. The circuit 104 may be implemented as a memory circuit. The circuit 104 generally comprises a memory array having a number of memory locations (not shown) and corresponding addresses. The memory 104 may be implemented as a memory array configured to store video frames that may be displayed by the video decoder where the video frame skip detection circuit 100 is implemented (e.g., the circuit 104 may be implemented as a video frame store and/or buffer).

The circuit 102 may have an output 110 that may present a signal (e.g., STRING), an input 112 that may receive a signal (e.g., DATA), an output 114 that may present a signal (e.g., DISPLAY), and an output that may present a signal (e.g., DO_NOT_DISPLAY). The circuit 104 may have an input 120 that may receive the signal STRING, an input 122 that may receive a signal (e.g., VIDEO), and an output 124 that may present the signal DATA.

The circuit 102 generally comprises a circuit 130, a circuit 132, and a circuit 134. The circuit 130 may be implemented as a central processing unit (CPU). The CPU 130 may be implemented as the system CPU for the video decoder system where the circuit 100 is implemented. The circuit 132 may be implemented as a buffer (or register) circuit. However, the circuit 132 may be implemented as any appropriate memory circuit configured to store the signal STRING. The circuit 134 may be implemented as a comparator circuit.

The signal STRING may be implemented as a random string of digital data generated by the circuit 130. In one example, the signal STRING may be implemented as an 8-byte sequence of random numbers generated by the circuit 130. The random numbers that comprise the signal STRING may be generated via any appropriate random number generation technique. The circuit 132 is generally configured to save (e.g., store, hold, etc.) the signal STRING for later comparison with the signal DATA via the circuit 134.

In one example, the signal STRING may be implemented as 8-bytes in length when the natural word length of the decoder where the circuit 100 is implemented is 8-bytes. As such, the 8-byte length may simplify system read and write processes. The signal STRING may be implemented having any appropriate length (e.g., the system natural word length) to meet the design criteria of a particular application. In other examples, the signal STRING may be implemented having longer or shorter lengths than the system natural word length. However, the longer the random data signal STRING is configured, the less likely decoded picture data will inadvertently (or accidentally) mimic (e.g., emulate, duplicate, match, etc.) the random data signal STRING. The signal STRING is generally stored in (e.g., written to, loaded to, etc.) one or more predetermined locations (e.g., specific destinations, addresses, etc.) in the memory circuit 104 prior to each decode process implemented by the decoder where the circuit 100 is implemented.

The signal VIDEO may be implemented as a decoded video frame signal (e.g., a video image). The decoder where the circuit 100 is implemented is generally configured to generate and present the signal VIDEO in response to an MPEG bit stream that has been decoded. The signal VIDEO may be generated when the decoder processes the video bit stream during a normal (e.g., an error free, a frame skip does not occur, etc.) decode operation. The signal VIDEO is generally stored in (e.g., written to, loaded to, etc.) the one or more locations in the memory circuit 104 where the respective signal STRING has been previously stored. When the signal VIDEO is longer than the signal STRING, the signal VIDEO may further be written to additional locations in the memory 104. The signal STRING is generally overwritten by the signal VIDEO. When an error occurs during a decoding operation, the decoder generally does not generate the signal VIDEO (e.g., a frame skip occurs) When a frame skip occurs and the decoder fails to generate and present the signal VIDEO to the circuit 104, the signal STRING is generally not overwritten (e.g., the signal STRING is unchanged).

The signal DATA may be implemented as a signal that is read from (e.g., retrieved from) the one or more locations in the memory circuit 104 where the signal STRING has been previously stored. When the signal VIDEO is written to the circuit 104, the signal DATA is read as the respective portion of the signal VIDEO. When a frame is skipped, since the signal VIDEO is not generated, the signal STRING is not overwritten and the signal DATA is read as the signal STRING.

The signals DISPLAY and DO_NOT_DISPLAY may be implemented as indication (e.g., notification, control, etc.) signals. The signals DISPLAY and DO_NOT_DISPLAY are generally presented to the video decoder system where the circuit 100 is implemented and/or the CPU 130. The signal DISPLAY may be generated by the comparator circuit 134 when the video frame has been decoded (e.g., the signal VIDEO was generated). The signal DISPLAY may provide the video system and/or the circuit 130 an indication (e.g., a notification and/or control signal to the video display system) that the contents of the memory circuit 104 at the locations (or addresses) that correspond to the respective signal VIDEO may be displayed. The signal DO_NOT_DISPLAY may be generated by the comparator circuit 134 when the respective video frame was skipped (e.g., not decoded and the signal VIDEO was not generated). The signal DO_NOT_DISPLAY may provide the video system and/or the circuit 130 an indication (e.g., a notification and/or control signal) that the contents of the memory circuit 104 at the locations (or addresses) that correspond to the respective signal VIDEO may contain invalid and/or incoherent data and should not be displayed.

Prior to each decode process, the circuit 102 may (i) generate the random number signal STRING via the CPU circuit 130, (ii) save (e.g., store, buffer, register, etc.) the random number signal STRING in the circuit 132, and (iii) present (or write) the signal STRING to the memory circuit 104. The circuit 104 may store the signal STRING at one or more specified (or predetermined) addresses (e.g., locations). The CPU circuit 130 may wait while the decoder in the video system where the circuit 100 is implemented performs a decode operation.

After the decoder has performed (e.g., executed) a decode process (e.g., the decoder has (i) generated a decoded video frame and written the decoded frame as the signal VIDEO in the circuit 104 or (ii) skipped a frame), the circuit 102 generally (i) reads the signal DATA and (ii) compares the signal DATA with the respective signal STRING via the comparator circuit 134. The comparator circuit 134 is generally configured to determine whether or not the signal DATA matches the signal STRING.

When the signal DATA and the signal STRING do not match (e.g., the signal DATA has a different value than the respective signal STRING), (i) the decoder has generally decoded a video frame and generated a valid respective video image signal VIDEO (e.g., a video frame skip has not occurred) and (ii) the signal STRING has been overwritten in the memory circuit 104. The comparator circuit 134 may generate and assert the signal DISPLAY. The video image signal VIDEO is generally displayed by the video decoder system.

When the signal DATA and the signal STRING match (e.g., the signal DATA has the same value as the respective signal STRING), (i) a video frame skip has generally occurred and the decoder has not generated a respective video image signal VIDEO and (ii) the signal STRING has not been overwritten in the memory circuit 104. The comparator circuit 134 may generate and assert the signal DO_NOT_DISPLAY. The contents of the memory circuit 104 at the locations (or addresses) that correspond to the respective signal VIDEO generally do not contain a valid decoded image VIDEO and are not be displayed.

Figure 2:
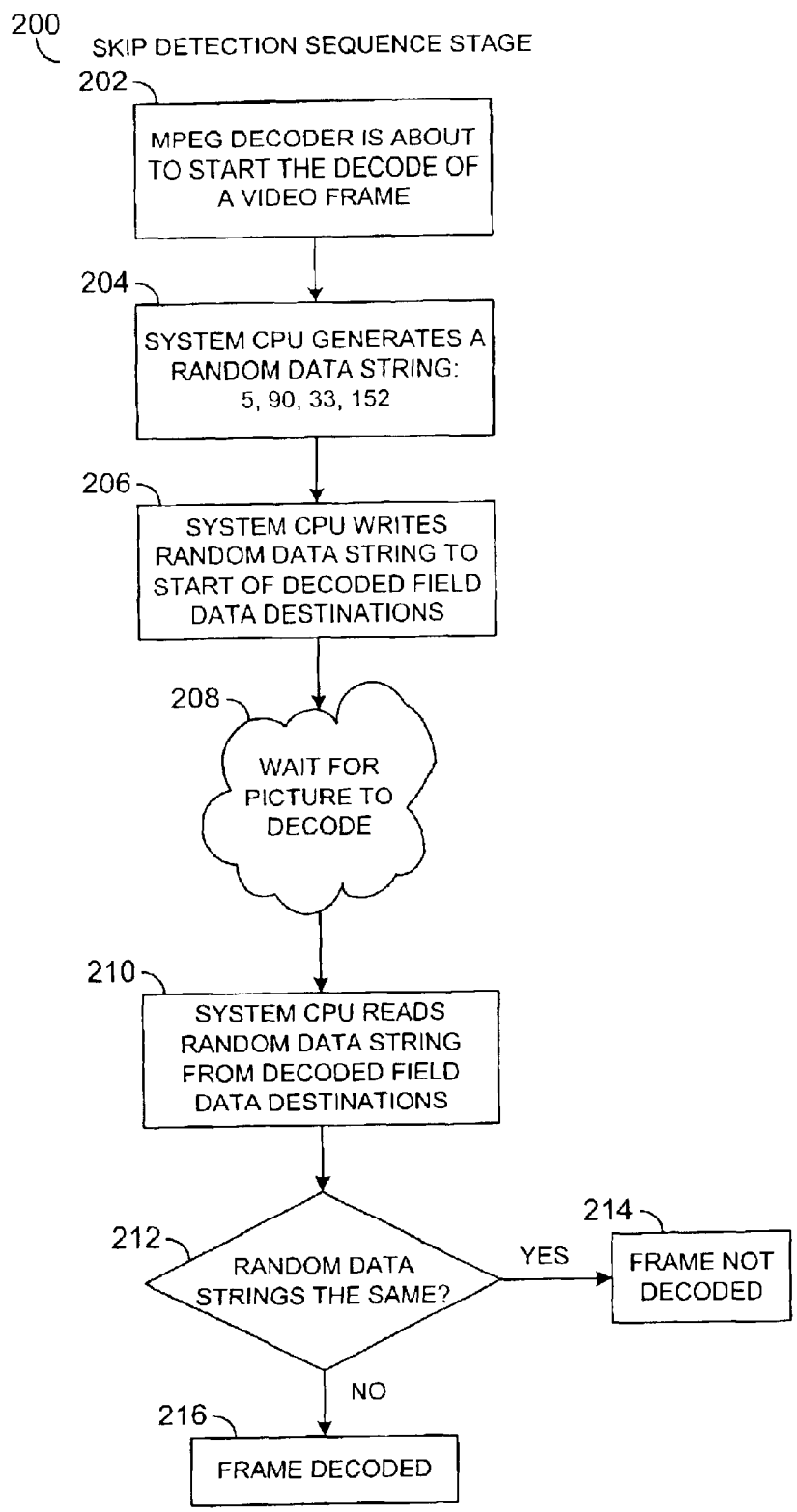
FIG. 2 is a flow diagram illustrating a video frame skip detection process of the present invention.

Referring to FIG. 2, a flow diagram 200 illustrating a frame skip detection process (e.g., method, routine, operation, etc.) in accordance with the present invention is shown. The method 200 may be implemented as a skip detection sequence stage of a video image decoding and display process. The process 200 may be implemented via the circuit 100 in any appropriate video decoder system. The operation 200 generally comprises a state (or block) 202, a state (or block) 204, a state (or block) 206, a state (or block) 208, a state (or block) 210, a decision state (or block) 212, a state (or block) 214, and a state (or block) 216.

During the state 202 a video frame decode operation is generally imminent in the decoder where the process 200 is implemented. The process 200 generally continues to the state 204. During the state 204 the CPU circuit 130 may generate a random data string (e.g., the signal STRING). The process 200 generally continues to the state 206.

During the state 206 the CPU circuit 130 generally writes the signal STRING to the memory circuit 104 and the buffer circuit 134. The signal STRING is generally written to one or more locations (or addresses) in the circuit 104 where the signal VIDEO is generally written. The process 200 generally continues to the state 208. During the state 208 the circuit 100 generally waits for the decoder to execute a decode process. After the decoder has performed a decode process (e.g., the decoder may have (i) generated a decoded video frame, stored the decoded frame as the signal VIDEO and overwritten the signal STRING in the circuit 104 or (ii) skipped a frame)), the method 200 generally continues to the state 210.

During the state 210 (i) the circuit 102 generally reads the signal DATA from the circuit 104 and presents the signal DATA to the circuit 134 and (ii) the circuit 132 generally presents the signal STRING to the circuit 134. The process 200 generally continues to the decision state 212.

During the decision state 212 the comparator circuit 134 generally compares the signals STRING and DATA. The decision state 212 generally determines whether or not the signal DATA matches the signal STRING. When the signals STRING and DATA match, the respective video frame has generally not been decoded. The respective video frame has been skipped and the signal STRING has generally not been overwritten in the circuit 104. The method 200 generally continues to the state 214. During the state 214 the circuit 134 generally asserts (or presents) the signal DO_NOT_DISPLAY.

Returning to the decision state 212, when the signals STRING and DATA do not match, the respective video frame generally has been decoded. The respective video image VIDEO has been generated and has generally overwritten the signal STRING in the circuit 104. The method 200 generally continues to the state 216. During the state 216 the circuit 134 generally asserts (or presents) the signal DISPLAY. The control signals DISPLAY and DO_NOT_DISPLAY are generally presented to the CPU 130 and/or the video decoder and display system where the circuit 100 and/or the method 200 are implemented.

Figure 3:
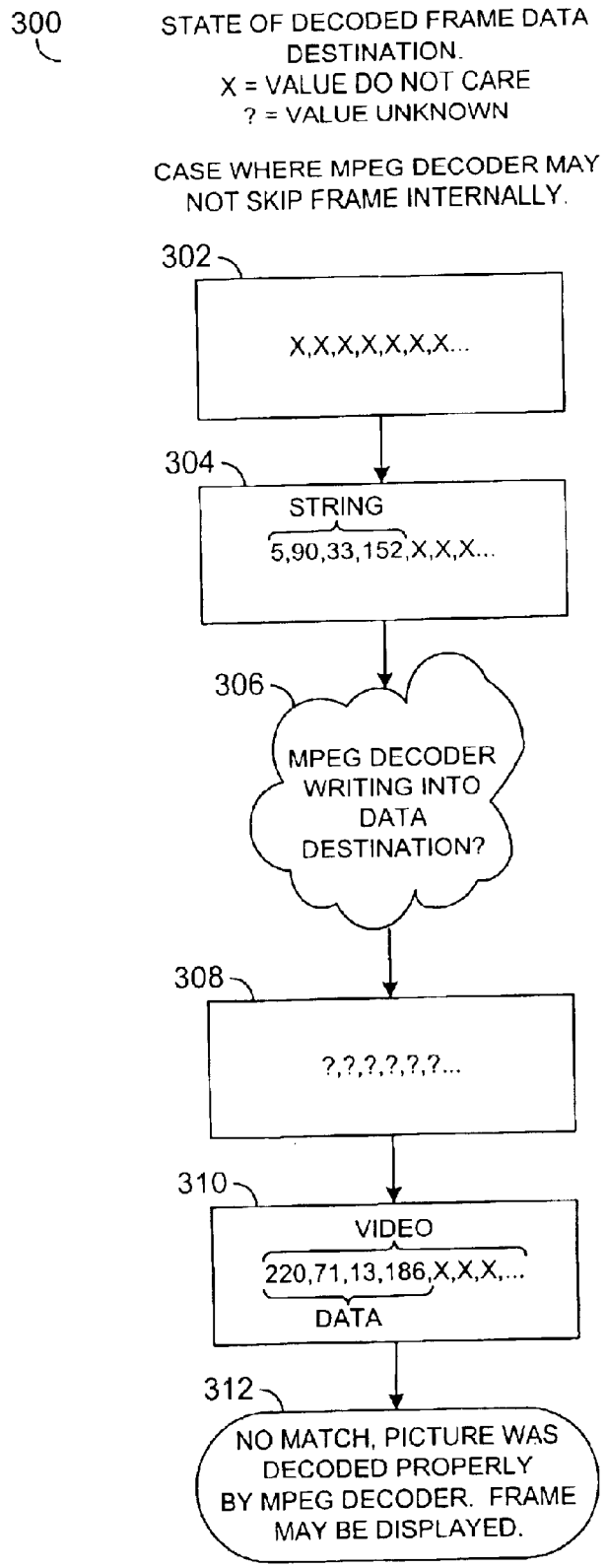
FIG. 3 is a flow diagram illustrating an example operation of the present invention.

Referring to FIG. 3, a flow diagram 300 illustrating an example operation in accordance with the present invention is shown. The operation (e.g., method, process, routine, etc.) 300 is generally implemented in connection with the circuit 100 and/or the method 200. The method 300 may be implemented for a case where the decoder where the circuit 100 (and/or the method 200) is implemented does not skip a respective video frame (e.g., a video image VIDEO is decoded). The process 300 generally comprises a state (or block) 302, a state (or block) 304, a state (or block) 306, a state (or block) 308, a state (or block) 310, and a state (or block) 312.

During the state 302 the contents of the memory 104 are generally at a 'do not care' state. The method 300 generally continues to the state 304. During the state 304 the circuit 102 (e.g., the CPU 130) may generate the random data number signal STRING and write the signal STRING to the circuit 104 and the circuit 132. One or more additional memory locations (or addresses) that correspond to the respective video frame storage location in the memory circuit 104 may remain in the undetermined state (e.g., the video image signal VIDEO may be larger than the signal STRING). The method 300 generally continues to the state 306.

During the state 306 the decoder where the process 300 is implemented may execute (or perform) a decode process. The decoder may (i) generate a decoded video frame and write the decoded frame as the video image signal VIDEO to the respective addresses in circuit 104 and overwrite the signal STRING or (ii) skip the frame. The method 300 generally corresponds to a case when the decoder generates a valid signal VIDEO. The method 300 generally continues to the state 308. During the state 308, the validity of the contents of the memory 104 is generally unknown. The circuit 102 may (i) read the respective contents of the memory 104 that correspond to the signal DATA (e.g., the locations of the circuit 104 that may be assigned to initially hold the signal STRING) and present the signal DATA to the comparator 134 and (ii) present the respective signal STRING from the circuit 132 to the comparator 134. The method 300 generally continues to the state 310.

During the state 310 the comparator circuit 134 may compare the signal STRING and the signal DATA. When the signal DATA is different than (e.g., does not match) the signal STRING, the method 300 generally continues to the state 312. Since the signals STRING and DATA do not match, the decoder has generally decoded an error free video image VIDEO (e.g., a frame skip has not occurred) and the frame (e.g., the contents of the memory 104 that correspond to the signal VIDEO) may be displayed.

Figure 4:
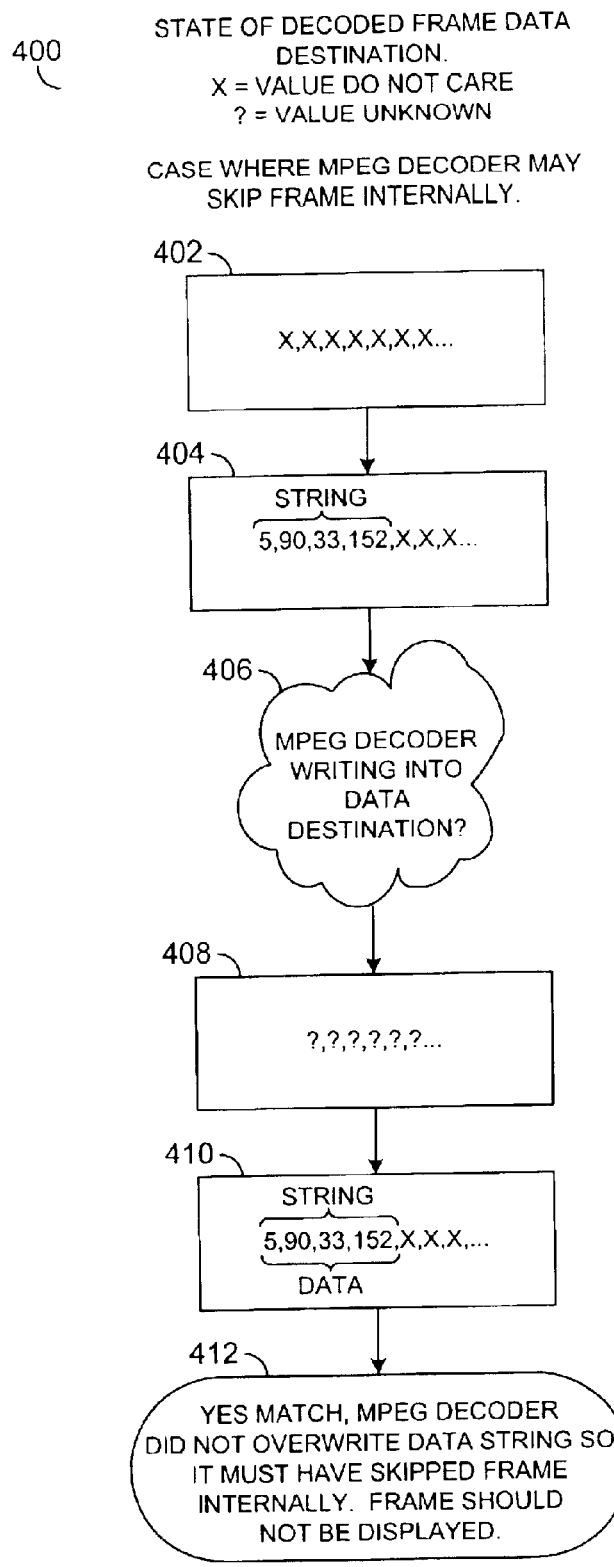
FIG. 4 is a flow diagram illustrating another example operation of the present invention.

Referring to FIG. 4, a flow diagram 400 illustrating another example operation in accordance with the present invention is shown. The operation (e.g., method, process, routine, etc.) 400 is generally implemented in connection with the circuit 100 and/or the method 200. The method 400 may be implemented for a case where the decoder where the circuit 100 (and/or the method 200) is implemented skips a respective video frame (e.g., a valid video image VIDEO is not decoded). The process 400 generally comprises a state (or block) 402, a state (or block) 404, a state (or block) 406, a state (or block) 408, a state (or block) 410, and a state (or block) 412.

During the state 402 the contents of the memory 104 are generally at a 'do not care' state. The method 400 generally continues to the state 404. During the state 404 the circuit 102 (e.g., the CPU 130) may generate the random data numbers STRING and write the signal STRING to the circuit 104 and the circuit 132. The method 400 generally continues to the state 406.

During the state 406 the decoder where the process 400 is implemented may execute (or perform) a decode process. The decoder may (i) generate a decoded video frame and write the decoded frame as the video image signal VIDEO to the respective address in circuit 104 or (ii) skip the frame. The method 400 generally corresponds to a case when the decoder skips a frame. The method 400 generally continues to the state 408. During the state 408, the validity of the contents of the memory 104 is generally unknown. The circuit 102 may (i) read the respective contents of the memory 104 that correspond to the signal DATA (e.g., the locations of the circuit 104 that may be assigned to initially hold the signal STRING) and present the signal DATA to the comparator 134 and (ii) present the respective signal STRING to the comparator 134. The method 400 generally continues to the state 410.

During the state 410 the comparator circuit 134 may compare the signal STRING and the signal DATA. When the signal DATA is the same as (e.g., matches) the signal STRING, the method 400 generally continues to the state 412. Since the signals STRING and DATA match, the decoder has generally not decoded a valid video image (e.g., a frame skip has occurred). The signal STRING is generally not overwritten in the circuit 104. The frame (e.g., the contents of the memory 104 that correspond to the signal VIDEO) may contain invalid and/or incoherent data and should not be displayed.

The skip detection process of the present invention (e.g., the methods 200, 300 and/or 400) generally comprises reading and writing random data strings (e.g., the signal STRING) to memory addresses in the circuit 104 where the MPEG video decoder generally writes a decoded frame data when a video frame is decoded into an error free video image (e.g., the image VIDEO). The data strings that comprise the signal STRING may be implemented having any appropriate length. However, the longer the signal STRING is configured, the less likely the respective portions of the decoded picture data (e.g., the signal VIDEO) will inadvertently mimic (or match) the data string signal STRING.

Before the decoder starts decoding a video frame, the system CPU 102 may generate and write the random data STRING to a specific point in the decoded video frame data destination memory 104 as well as the buffer memory 132. When the time to display the decoded video frame occurs, the system CPU 102 may read the signal DATA from the memory 104 location where the signal STRING was stored. When the signal DATA has a different value than the respective signal STRING, the decoder has generally overwritten the memory 104 location where the signal STRING was stored with decoded frame data (e.g., all or a portion of the signal VIDEO) and no frame skip has occurred. When the data string DATA is exactly the same as was written into the circuit 104 previously as the signal STRING, the decoder has generally skipped the frame internally and has presented nothing to the respective decoded data destination in the memory circuit 104.

Prior to start of frame decode, the system CPU 102 may generate a random string of data values as the signal STRING. The data that comprises the signal STRING is generally random since video decoder system does not generate predetermined decoded picture data (e.g., the signal VIDEO does not have predetermined content). The signal STRING may be random to minimize the chances of the decoded frame data (e.g., the respective portions of the signal VIDEO) accidentally (or inadvertently) mimicking (or matching) the random data string STRING. The circuit 100 (and/or the CPU 130) generally implements a random number generator and a significantly long data signal STRING.

In one example, the signal STRING may be implemented having four bytes. In another example (e.g., where the natural word length is 8 bytes and the circuit 100 is configured to provide a random signal having a length that matches the natural word length to simplify read and/or write operations), the signal string may be implemented having 8 bytes. However, the signal STRING may be implemented having any appropriate length (generally four or more bytes) to meet the design criteria of a particular application. A word length that provides 1 in $2^{32}$ or more combinations is generally adequate to provide an emulation that may avoid inadvertent duplication of the signals STRING and the corresponding portion of the signal VIDEO as the signal DATA. The signal STRING is generally saved in the circuit 132 for later comparison with the signal DATA via the circuit 134.

The circuit 100 is generally configured to write the random data STRING to a specific point in the decoder frame store 104 target destination (e.g., the destination address of the respective portion of the signal VIDEO).

Video frames that are MPEG compliant are generally decoded into two display fields (e.g., a luma field and a chroma field) for output (e.g., presentation) to standard televisions. The frame skip detection system 100 may write the random data STRING to two locations in the memory 104 (e.g., the start address of where the decoder would place the decoded frame data for each respective display field). Since the signal STRING may be stored in both top and bottom fields of the luma and/or the chroma display fields, the video system 100 may determine whether or not at least one display field was decoded.

The MPEG standards may also specify a progressive sequence. The progressive sequence does not implement the display fields feature that is implemented for standard television video signals. The MPEG progressive sequence implements a single display frame. Implementation of a single display frame does not hinder the skip detection system of the present invention since a second presentation of the random data signal STRING may be optional and/or ignored. The addresses where the data signal STRING is stored in the memory 104 are generally saved by the system CPU 102 such that the signal DATA may be retrieved later.

After the respective video frame has been decoded (or alternatively, skipped), the system CPU 102 generally reads out the signal DATA from the addresses where the random data strings (e.g., one or more instances of the signal STRING) were written prior to the start of the decode operation. The circuit 134 may compare the retrieved data strings DATA with the signal STRING. When even a single byte is different, the decoder has generally overwritten the destination location in the memory 104 with the decoded frame data VIDEO and there was no frame skip. When all of the data strings are exactly the same (e.g., the signals DATA and STRING match), the MPEG decoder generally failed to write anything to the decoded data destination in the memory 104 and, therefore, the decoder skipped the respective picture internally. The video system (and/or the CPU 102) may avoid displaying the respective video frame since the data contained therein is generally invalid and/or incoherent.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:

a first circuit configured to (i) generate a random number signal, (ii) read a data signal, and (iii) generate one or more control signals; and a second circuit configured to (i) store said random number signal, (ii) receive and store a decoded video signal, and (iii) present said data signal, wherein (a) said first circuit is further configured to compare said data signal with said random number signal and (i) generate a first of said control signals when said data signal matches said random number signal and (ii) generate a second of said control signals when said data signal fails to match said random number signal and (b) (i) said random number signal is stored at one or more locations in said second circuit where portions or all of said decoded video signal are stored and (ii) said decoded video signal overwrites said random number signal when said second control signal indicates a video frame decoding skip has not occurred.

2. The apparatus according to claim 1, wherein said decoded video signal comprises a signal compliant with one or more Motion Picture Expert Group (MPEG) standards.

3. The apparatus according to claim 1, wherein said first circuit further comprises a central processing unit (CPU) configured (i) to generate said random number signal and (ii) to receive said one or more control signals.

4. The apparatus according to claim 1, wherein said data signal is read from said one or more locations in said second circuit.

5. The apparatus according to claim 1, wherein said first circuit further comprises a buffer circuit configured to store said random number signal.

6. The apparatus according to claim 1, wherein said first circuit further comprises a comparator circuit configured to compare said data signal with said random number signal.

7. The apparatus according to claim 1, wherein said apparatus is configured to wait for said decoded video signal prior to reading said data signal.

8. An apparatus comprising:
   means for generating a random number signal and writing said random number signal to one or more memory circuit locations;
   means for receiving and storing a decoded video signal;
   means for reading a data signal from said memory circuit locations; and
   means for comparing said random number signal with said data signal and (i) when said data signal matches said random number signal, generating a first control signal that indicates a video frame skip has occurred and (ii) when said data signal does not match said random number signal, generating a second control signal that indicates a video frame skip has not occurred, wherein (i) said random number signal is stored at one or more locations in said second circuit where portions or all of said decoded video signal are stored and (ii) said decoded video signal overwrites said random number signal when said second control signal indicates a video frame decoding skip has not occurred.

9. A method for detecting video frame decoding skip comprising the steps of:
   (A) generating a random number signal and writing said random number signal to one or more memory circuit locations;
   (B) receiving and storing a decoded video signal;
   (C) reading a data signal from said memory circuit locations; and
   (D) comparing said random number signal with said data signal and (i) when said data signal matches said random number signal, generating a first control signal and (ii) when said data signal does not match said random number signal, generating a second control signal indicating a decoding skip has not occurred wherein said method overwrites said random number signal with said decoded video signal when said video frame decoding skip has not occurred.

10. The method according to claim 9, wherein said first control signal is configured to indicate that said video frame decoding skip has occurred.

11. The method according to claim 9, wherein said memory locations comprise a luma field and a chroma field.

12. The method according to claim 9, wherein step (A) further comprises the sub-step of waiting for said decoded video signal.

13. The method according to claim 9, wherein said decoded video signal comprises a signal compliant with one or more Motion Picture Expert Group (MPEG) standards.

14. The method according to claim 9, wherein step (A) further comprises the sub-step of generating said random number signal via a central processing unit (CPU).

15. The method according to claim 9, wherein step (A) further comprises the sub-step of storing said random number signal in a buffer circuit.

16. The method according to claim 15, wherein step (A) further comprises the sub-step of comparing said data signal with said random number signal.

17. The method according to claim 14, said method further comprising presenting said first and second control signals to said CPU.

18. An apparatus comprising:
   a first circuit configured to (i) generate a random number signal, (ii) read a data signal, and (iii) generate a control signal; and
   a second circuit configured to (i) store said random number signal, (ii) receive and store a decoded video signal, and (iii) present said data signal, wherein (a) said first circuit is further configured to (i) compare said data signal with said random number signal and (ii) generate said control signal having a first state when said data signal matches said random number signal and a second state when said data signal fails to match said random number signal indicating a video frame decoding skip has not occurred and (b) (i) said random number signal is stored at one or more locations in said second circuit where portions or all of said decoded video signal are stored and (ii) said decoded video signal overwrites said random number signal in response to said second state of said control signal.

* * * * *